United States Patent [19]

Dichter

[11] Patent Number: 5,612,795
[45] Date of Patent: Mar. 18, 1997

[54] HSL CORRECTIONS IN CMY COLOR SPACE

[75] Inventor: Wilhelm Dichter, Tewksbury, Mass.

[73] Assignee: Linotype-Hell AG, Eschborn, Germany

[21] Appl. No.: 302,247

[22] Filed: Sep. 8, 1994

Related U.S. Application Data

[63] Continuation of Ser. No. 974,529, Nov. 12, 1992, abandoned.

[51] Int. Cl.⁶ ........................................ H04N 1/60
[52] U.S. Cl. ............................. 358/518; 358/520
[58] Field of Search ........................ 358/518, 520, 358/527, 529; 355/77, 326 R, 327; 348/592, 599; 382/44, 45, 167; H04N 1/60

[56] References Cited

U.S. PATENT DOCUMENTS

| | | | |
|---|---|---|---|
| 4,631,579 | 12/1986 | Hoffrichter et al. | 358/515 |
| 4,758,885 | 7/1988 | Sasaki et al. | 358/520 |
| 4,972,257 | 11/1990 | Birnbaum et al. | 358/520 |
| 4,975,768 | 12/1990 | Takaraga . | |
| 5,077,604 | 12/1991 | Kivolowitz et al. | 358/520 |
| 5,181,068 | 1/1993 | Morikawa | 358/529 |
| 5,237,400 | 8/1993 | Washio et al. | 358/518 |
| 5,237,517 | 8/1993 | Harrington et al. | 358/520 |

*Primary Examiner*—Kim Vu
*Attorney, Agent, or Firm*—Hill, Steadman & Simpson

[57] ABSTRACT

Original CMYK printing colors of an original image are corrected, and then the corrected printing colors are converted by color computer to RGB video signals for display on a color video display. The desired corrections are defined in terms of HSL (hue, saturation, luminance) changes. The original CMY printing colors are transformed to the corrected or new CMY printing colors by use of the HSL changes without a color space translation. The HSL changes are directly applied to the original CMY printing colors to arrive at the new CMY printing colors. The transformation comprises using a gray line representing an absence of color and changing luminance within the original CMYK printing color space and executing the HSL changes with respect to the gray line. The HSL changes are clamped within the color space so that no new CMYK printing colors result which are unprintable outside the color space.

13 Claims, 3 Drawing Sheets

$(CMY)_{ORIGINAL} \rightarrow$ HUE CHANGE $\rightarrow (CMY)_{NEW}$ (CMY) ORIGINAL → SATURATION CHANGE → (CMY) NEW (CMY) ORIGINAL → LUMINANCE CHANGE → (CMY) NEW

HSL CORRECTIONS IN CMY COLOR SPACE

This is a continuation of application Ser. No. 07/974,529, filed Nov. 12, 1992, now abandoned.

BACKGROUND OF THE INVENTION

The present invention relates to color manipulation for digital image processing in the prepress industry.

Human perception of color changes described in terms of a CMY (cyan, magenta, yellow) color space is not intuitive. Traditional color manipulation requires the color changes to be specified in abstract CMY percentages. Some fundamental color manipulations, e.g. brightening, saturating and turning a "color wheel", cannot be defined in these terms.

Stated differently, when you change one or more of the colors, C, M, Y, and K, the resultant color change is not normally humanly predictable, since colors result which are unexpected, based on human experience.

As a result, it has required highly trained operators involved in the pre-press industry to know what color will result when various changes are effected in C, M, Y, and K.

In a first prior art system and method as shown in FIG. 1, an image scanner 1 outputs $C_{orig}$, $M_{orig}$, $Y_{orig}$, and $K_{orig}$ color signal values, derived by scanning an original image, to a computer or hardware circuit 2 which performs a CMYK transformation to create new color values $C_{new}$, $M_{new}$, $Y_{new}$, and $K_{new}$. Here an operator inputs desired corrections to the image by inputting individual C, M, Y, and K changes. In other words, a specific change for $C_{orig}$ to $C_{new}$ is input independently of changes for the other three colors. The new color values $C_{new}$, $M_{new}$, $Y_{new}$, and $K_{new}$ are then input to a color computer which takes into account the paper type on which the image is to be eventually printed. This is necessary since various paper types have various effects on the resulting color of inks when the inks are applied to the paper. The color computer also converts the $C_{new}$, $M_{new}$, $Y_{new}$, and $K_{new}$ values to R, G, B, video signals and then inputs the color video signals to a well known color video display 4. As a result, the operator can see on the color video display 4 a true rendition of the colors as they will be printed on the paper, but after the corrections have been input. Thus, the operator can see precisely how the image will appear later in print.

A problem with this approach shown in FIG. 1 is that it requires a highly trained operator to know how the change input for one of the colors C, M, Y, and K will affect the overall result in terms of hue, saturation, and luminance. Thus, the prior art technique in FIG. 1 is laborious and time consuming and requires highly trained operators.

A second prior art approach is shown in FIG. 2.

As a result of attempts to introduce more intuitive color manipulation, HSL (Hue, Saturation, Luminance) changes are executed in three steps. In a first step, the original image from scanner 1 is translated by translation 5 from the printable CMY color space to the HSL (or equivalent) color space, which is unprintable but convenient for calculation. In a second step, the HSL changes are applied in an HSL transformation 6 according to a binary mask and are executed in a new color space. In a third step, the new image is translated by translation 8 back to the printable color space.

$(CMY)_{original} \rightarrow$ color space translation $\rightarrow [HSL(\text{or equivalent})]_{original}$ $[HSL(\text{or equivalent})]_{original} \rightarrow HSL$ change $\rightarrow [HSL(\text{or equivalent})]_{new}$ $[HSL(\text{or equivalent})]_{new} \rightarrow$ color space translation $\rightarrow (CMY)_{new}$ In this approach shown in FIG. 2, it is difficult to: 1) accomplish quality translations between color spaces; 2) meet precision requirements; 3) decide how to treat unprintable colors; 4) achieve interactive performance; 5) avoid the undesirable effects of binary weighting; and 6) the new color values resulting from corrections, namely $C_{new}$, $M_{new}$, $Y_{new}$, and $K_{new}$, may lie outside the color space and be impossible to print, even though the colors have been properly rendered on the video display.

SUMMARY OF THE INVENTION

It is an object of the invention to improve over the prior art system shown in FIG. 1 such that changes which are instituted are clamped into the available color space so that new CMYK color values do not result which cannot be printed, even though they are properly viewed on the display screen.

It is a further object to provide a method which is an improvement over the prior art shown in FIG. 2 by eliminating the need for translations first from CMYK to HSL and later from HSL back to CMYK for printing.

According to the invention, color manipulation is simpler and more natural when done by hue, saturation, and luminance adjustments. Furthermore, there are advantages to maintaining images in the printable CMY color space during color manipulation.

With the method of the invention, original CMYK color values or printing colors are transformed to new CMYK printing colors having corrections desired by an operator. The operator inputs the desired corrections by defined HSL changes. First the original CMYK printing colors are provided. The CMY colors are then corrected by defining the desired corrections in terms of corresponding HSL changes. These HSL changes are then used to transform the original CMY printing colors to new CMY printing colors by use of the HSL changes, but without the need for a color space translation. Preferably, with the invention the transformation occurs in the original CMYK printing color space by identifying the gray line thereof, and executing the HSL changes with respect to the gray line.

With the invention, hue, saturation and luminance changes are applied directly to the CMY colors and are executed smoothly in the CMY color space according to a weighted mask. Both original and new images are maintained in the same printable CMY color space. The hue, saturation and luminance changes are executed with respect to the gray line rather than the color cube diagonal. The gray line extends nonlinearly throughout the CMY color space. The hue, saturation and luminance changes are executed in one step without the color space translations. All calculations are based on the original image and are performed on a pixel by pixel basis.

DESCRIPTION OF THE PREFERRED EMBODIMENTS

Figure 3:
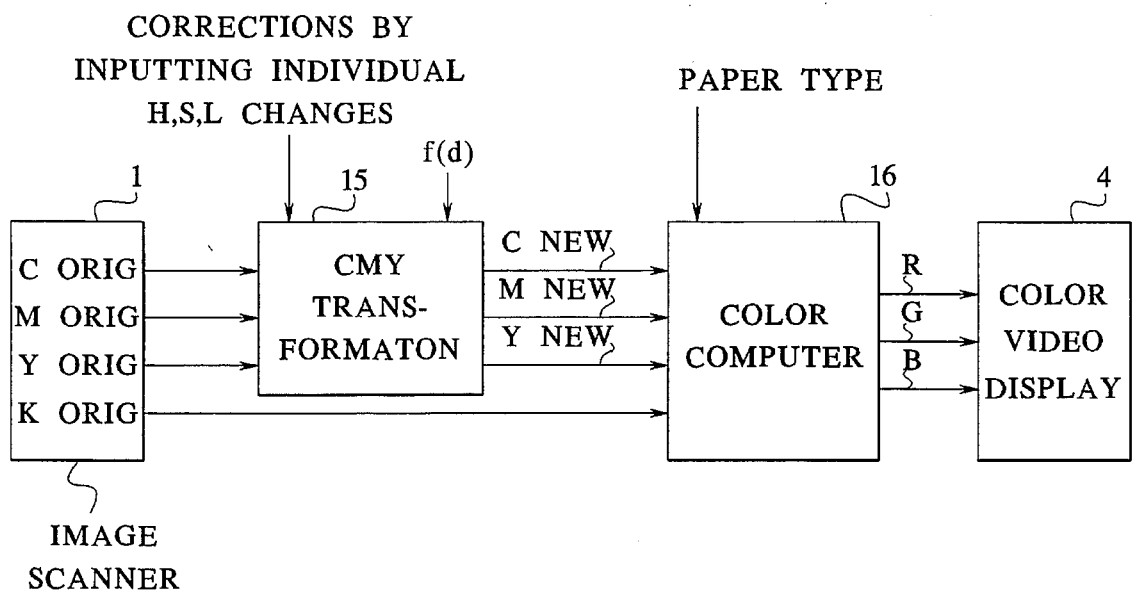
FIG. 3 is a block diagram showing the method and system of the invention wherein corrections are entered by HSL changes without the need for translations.

The inventive method and system is shown in the block diagram of FIG. 3. Here an image scanner 1 outputs original color values CMYK. The CMY original values are input to a CMY transformation 15. Here, corrections desired by the operator of the system, for example to the hue, saturation, or luminance of various portions of the original image, are entered in terms of H, S, and L changes at the CMY transformation 15. As a result, new values $C_{new}$, $M_{new}$, and $Y_{new}$ are output to the color computer 16. The specific mathematics employed for the CMY transformation are described in detail hereafter. Also input at the CMY transformation 15 is a weighting function f(d) described hereafter.

The new CMY values together with the original K value are then input to the color computer 16 together with the paper type as explained previously. The color computer in accordance with the known prior art then creates R, G, B video signals for driving the color video display 4 in well known prior art manner. The image which is displayed on the color video display 4 is an accurate rendition of how the image after correction will appear when printed.

Figure 1:
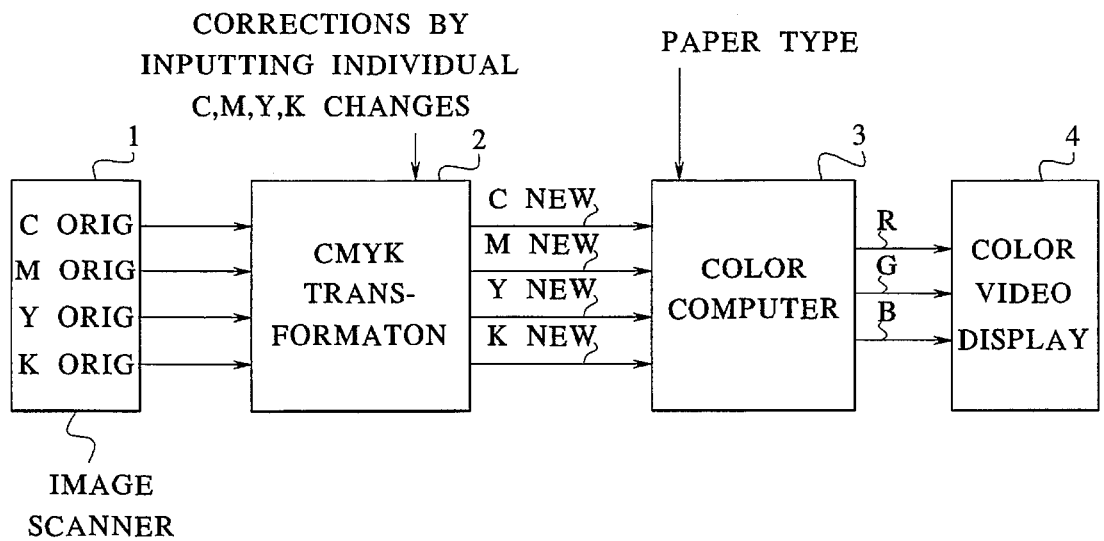
FIG. 1 is a block diagram illustrating a first prior art technique for correcting original CMYK colors and displaying them on a color video display.

As can be seen in FIG. 3, translations are avoided. Thus, the undesirable effects resulting from translations, such as time delay and errors are avoided. Equipment expense is also reduced. Furthermore, the resulting image is clamped within the color space as described hereafter so that the system cannot accidentally produce CMYK colors which are not actually printable, even though they are correctly viewable on the color video display 4. There is thus this further advantage over the prior art system, such as shown in FIG. 1 above.

Figure 5:
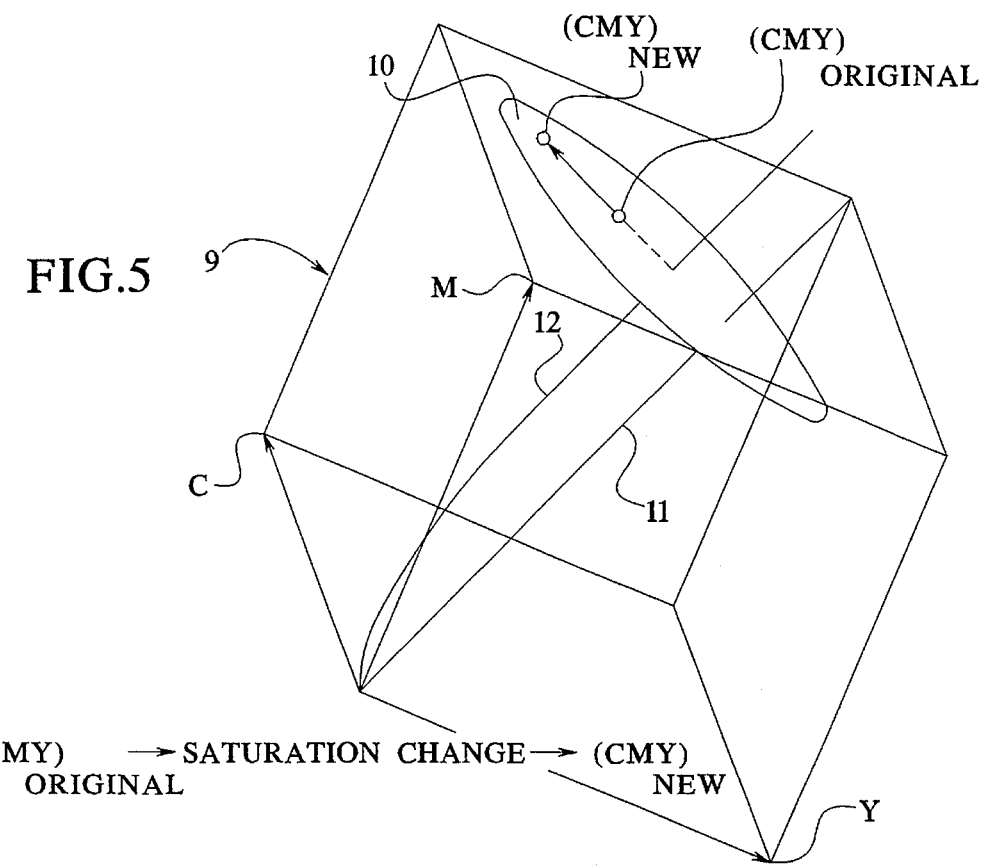
FIG. 5 illustrates saturation change S in the CMY color space according to the invention.
Figure 6:
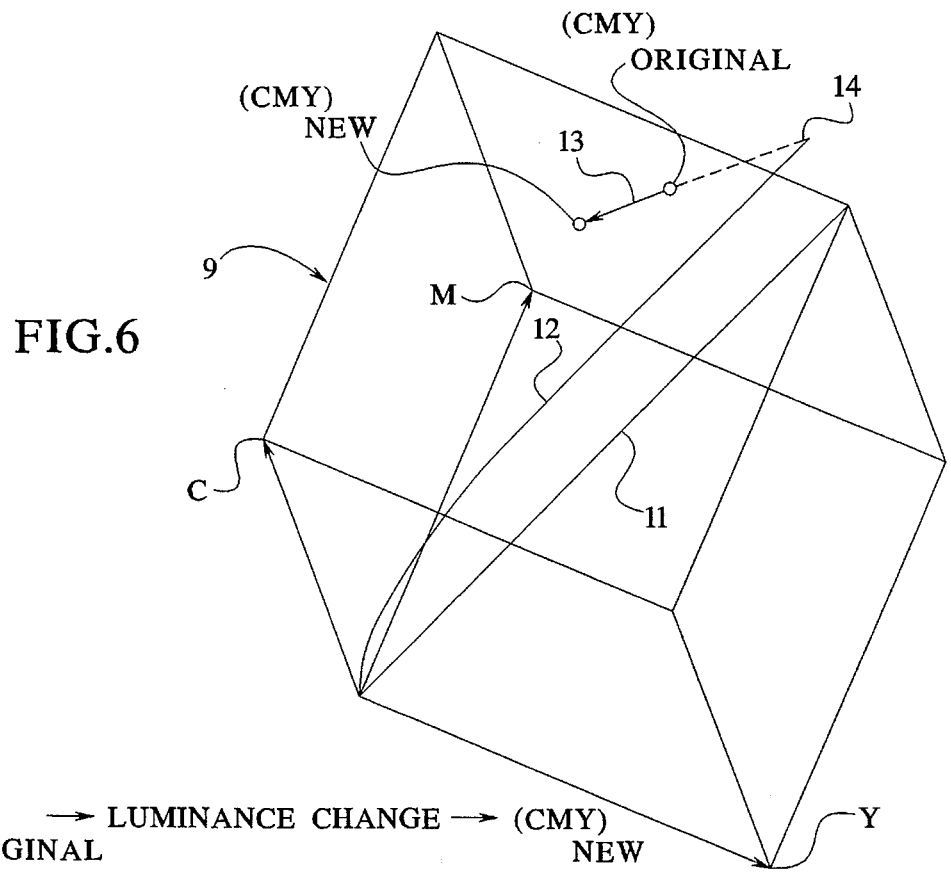
FIG. 6 illustrates luminance change L in the CMY color space according to the invention.

The specific mathematics involved in the CMY transformation 15 in FIG. 3 will now be described for each of the corrections input in terms of hue, saturation, and luminance changes in the CMY transformation 15. In this regard, attention is directed to FIGS. 4, 5, and 6 hereafter.

HUE CHANGE

Figure 4:
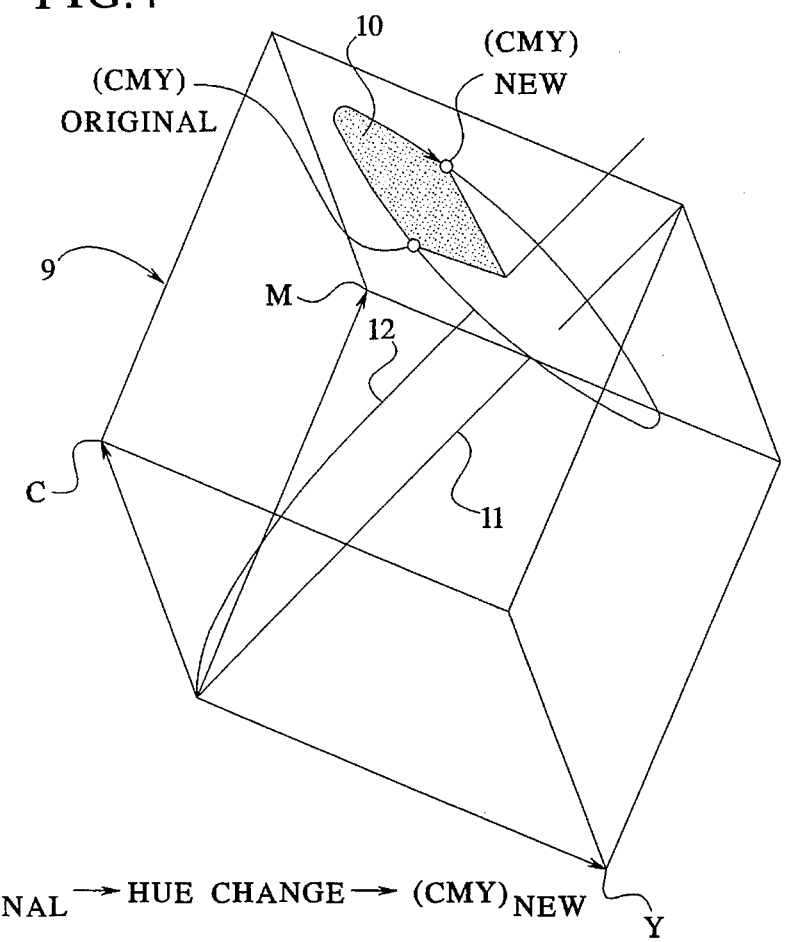
FIG. 4 illustrates hue change H in the CMY color space according to the invention.

As shown in FIG. 4, which shows hue change in a CMY color space 9, each hue change is applied directly to the CMY colors and is executed in the CMY color space. The original color rotates in its luminance plane 10 (perpendicular to the color cube diagonal 11) around the intersection of this plane with the gray line 12 (the gray line is a line through the color space representing increasing luminance but with the absence of color):

$(CMY)_{original} \rightarrow$ hue change $\rightarrow (CMY)_{new}$.

A maximum desired hue change is described as: $-180° \leq CHANGE \leq 180°$. Input data consists of: 1) the image as an array of pixels, with the $(CMY)_{original}$ color components being specified for each pixel; and 2) an optional weighting mask as an array of pixels, with a percentage of the maximum desired change specified for each pixel; $0 \leq d \leq 100\%$ (for a global change d=100%).

For each pixel of the image, the following five steps are carried out:

1. Two change coefficients are calculated according to the maximum desired hue change and an arbitrary function of the optional weight:

$$COEFF_1 = \cos[f(d)CHANGE] \text{ and } COEFF_2 = \frac{\sqrt{3}}{3} \sin[f(d)CHANGE]$$

2. The intersection of the color cube diagonal with a luminance plane perpendicular to it is calculated as:

$$D = \frac{1}{3}(Y_{original} + M_{original} + C_{original})$$

3. The intersection of the gray line with a luminance plane is calculated as the empirically established function of the color cube diagonal intersection with the same plane:

$$Y_{gray} = f_Y(D), M_{gray} = f_M(D) \text{ and } C_{gray} = f_C(D)$$

4. New color components (after the hue change) are calculated as:

$$Y_{new} = COEFF_1(Y_{original} - Y_{gray}) + COEFF_2(M_{original} - M_{gray} - C_{original} + C_{gray}) + Y_{gray}$$

$$M_{new} = COEFF_1(M_{original} - M_{gray}) + COEFF_2(C_{original} - C_{gray} - Y_{original} + Y_{gray}) + M_{gray}$$

$$C_{new} = COEFF_1(C_{original} - C_{gray}) + COEFF_2(Y_{original} - Y_{gray} - M_{original} + M_{gray}) + C_{gray}$$

5. The new color components can be clamped between the color limits of the available CMY color space and/or subjected to the saturation adjustment which preserves the desired hue and luminance values for $0 \leq C_{gray} \leq C_{max}$.

$$C_{new,corr} = COEFF(C_{new} - C_{gray}) + C_{gray}$$

$$M_{new,corr} = COEFF(M_{new} - M_{gray}) + M_{gray}$$

$$Y_{new,corr} = COEFF(Y_{new} - Y_{gray}) + Y_{gray}$$

where COEFF is the smallest of:

$$\frac{C_{limit} - C_{gray}}{C_{new} - C_{gray}}, \frac{M_{limit} - M_{gray}}{M_{new} - M_{gray}} \text{ and } \frac{Y_{limit} - Y_{gray}}{Y_{new} - Y_{gray}}$$

where:

$COLOR_{limit} = 0$ for $COLOR_{new} < 0$
$COLOR_{limit} = COLOR_{max}$ for $COLOR_{new} > COLOR_{max}$
$COLOR_{limit} = COLOR_{new}$

SATURATION CHANGE

Figure 2:
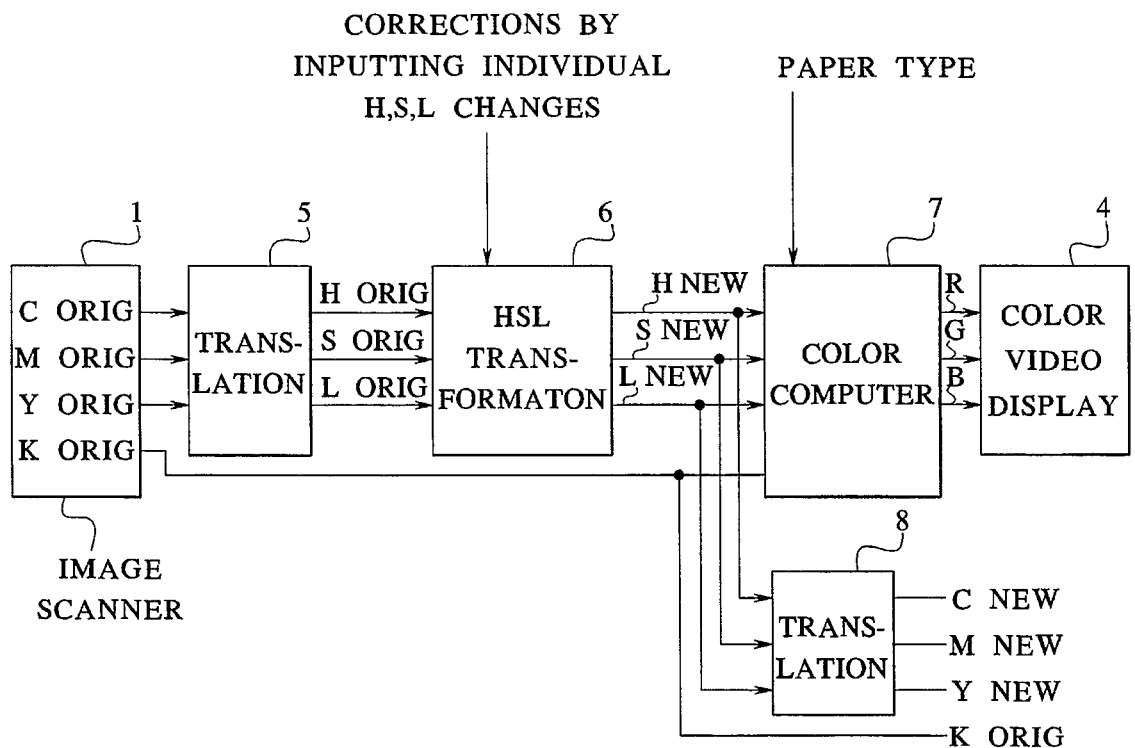
FIG. 2 is a block diagram of another prior art technique wherein HSL values are employed in an HSL transformation to input desired corrections, and then displaying the corrected values by RGB video signals on a color video display.

As shown in FIG. 2, which shows saturation change in the CMY color space 9, a saturation change is applied directly to the CMY colors and is executed in the CMY color space 9. The original color moves along the line which connects this color to the intersection of its luminance plane 10 with the gray line 12. Decreases and increases in saturation are achieved by moving to and from this intersection, respectively:

$$(CMY)_{original} \rightarrow \text{saturation change} = (CMY)_{new}$$

A maximum desired saturation change is described as a percentage of the actual saturation: $0 \leq CHANGE \leq 1$ for saturation decrease and $1 < CHANGE$ for saturation increase. Input data consists of: 1) the image as an array of pixels, with the $(CMY)_{original}$ color components being specified for each pixel; and 2) an optional weighting mask as an array of pixels, with a percentage of the maximum desired change specified for each pixel; $0 \leq d \leq 100\%$ (for a global change $d=100\%$).

For each pixel of the image, the following five steps are carried out:

1. The change coefficient is calculated according to the maximum desired saturation change and an arbitrary function of the optional weight:

$$COEFF = 1 + F(D)CHANGE$$

2. The intersection of the color cube diagonal with a luminance plane perpendicular to it is calculated as:

$$D = \frac{1}{3}(Y_{original} + M_{original} + C_{original})$$

3. The intersection of the gray line with a luminance plane is calculated as the empirically established function of the color cube diagonal intersection with the same plane:

$$Y_{gray} = f_Y(D), \; M_{gray} = f_M(D) \text{ and } C_{gray} = f_C(D)$$

4. New color components (after the saturation change) are calculated as:

$$Y_{new} = COEFF(Y_{original} - Y_{gray}) + Y_{gray}$$

$$M_{new} = COEFF(M_{original} - M_{gray}) + M_{gray}$$

$$C_{new} = COEFF(C_{original} - C_{gray}) + C_{gray}$$

5. The new color components can be clamped between the color limits of the available CMY color space and/or are subjected to the saturation adjustment which preserves the desired hue and luminance values for $0 \leq C_{gray} \leq C_{max}$.

$$C_{new,corr} = COEFF(C_{new} - C_{gray}) + C_{gray}$$

$$M_{new,corr} = COEFF(M_{new} - M_{gray}) + M_{gray}$$

$$Y_{new,corr} = COEFF(Y_{new} - Y_{gray}) + Y_{gray}$$

where COEFF is the smallest of:

$$\frac{C_{limit} - C_{gray}}{C_{new} - C_{gray}}, \; \frac{M_{limit} - M_{gray}}{M_{new} - M_{gray}} \text{ and } \frac{Y_{limit} - Y_{gray}}{Y_{new} - Y_{gray}}$$

where:

$COLOR_{limit} = 0$ for $COLOR_{new} < 0$
$COLOR_{limit} = COLOR_{max}$ for $COLOR_{new} > COLOR_{max}$
$COLOR_{limit} = COLOR_{new}$

LUMINANCE CHANGE

As illustrated in FIG. 3, which shows luminance change in the CMY color space, each luminance change is applied directly to the CMY colors and is executed in the CMY color space. The original color moves along the line 13 which connects this color to the point of minimum luminance 14 on the gray line 12. Decreases and increases in luminance are achieved by moving to and from this point, respectively:

$$(CMY)_{original} \rightarrow \text{luminance change} \rightarrow (CMY)_{new}.$$

A maximum desired luminance change is described as a percentage of the actual luminance: $0 \leq CHANGE \leq 1$ for luminance decrease and $1 < CHANGE$ for luminance increase. Input data consists of: 1) the image as an array of pixels, with the $(CMY)_{original}$ color components being specified for each pixel; 2) an optional weighting maxk as an array of pixels, with a percentage of the maximum desired change specified for each pixel: $0 \leq d \leq 100\%$ (for a global change $d=100\%$).

For each pixel of the image, the following five steps are carried out:

1. The change coefficient is calculated according to the maximum desired luminance change and an arbitrary function of the optional weight:

$$COEFF = 1 + f(d)CHANGE$$

2. The intersection of the color cube diagonal with the largest color luminance plane is calculated as:

$$D_{max} = \frac{1}{3}(Y_{max} + M_{max} + C_{max})$$

3. The point of minimum luminance on the gray line is described as:

$$Y_{gray,max} = f_Y(D), \; M_{gray,max} = f_M(D) \text{ and } C_{gray,max} = f_C(D_{max})$$

4. New color components (after the luminance change) are calculated as:

$$Y_{new} = COEFF(Y_{original} - Y_{gray,max}) + Y_{gray,max}$$

$$M_{new} = COEFF(M_{original} - M_{gray,max}) + M_{gray,max}$$

$$C_{new} = COEFF(C_{original} - C_{gray,max}) + C_{gray,max}$$

5. The new color components can be clamped between the color limits of the available CMY color space and/or are subjected to the saturation adjustment which preserves the desired hue and luminance values for $0 \leq C_{gray} \leq C_{max}$.

$$C_{new,corr} = COEFF(C_{new} - C_{gray,new}) + C_{gray,new}$$

$$M_{new,corr} = COEFF(M_{new} - M_{gray,new}) + M_{gray,new}$$

$$Y_{new,corr} = COEFF(Y_{new} - Y_{gray,new}) + Y_{gray,new}$$

where COEFF is the smallest of:

$$\frac{C_{limit} - C_{gray}}{C_{new} - C_{gray}}, \frac{M_{limit} - M_{gray}}{M_{new} - M_{gray}} \text{ and } \frac{Y_{limit} - Y_{gray}}{Y_{new} - Y_{gray}}$$

where:

COLOR$_{limit}$=0 for COLOR$_{new}$<0
COLOR$_{limit}$=COLOR$_{max}$ for COLOR$_{new}$>COLOR$_{max}$
COLOR$_{limit}$=COLOR$_{new}$ The intersection of the color cube diagonal with the new color luminance plane is calculated as:

$$D_{new} = \tfrac{1}{3}(Y_{new} + M_{new} + C_{new})$$

The intersection of the gray line with the new color luminance plane is calculated as the empirically established function of the color cube diagonal intersection with the same plane:

$$Y_{gray,new} = f_Y(D_{new}), M_{gray,new} = f_M(D_{new}) \text{ and } C_{gray,new} = f_C(D_{max})$$

Although various minor changes and modifications might be proposed by those skilled in the art, it will be understood that I wish to include within the claims of the patent warranted hereon all such changes and modifications as reasonably come within my contribution to the art.

I claim as my invention:

1. A method for permitting an operator to introduce corrections in an original image represented by original CMYK printing colors, comprising the steps of:

providing original CMYK printing colors to be corrected by scanning the original image with an image scanner;

having the operator define desired corrections directly in terms of HSL changes without the operator making reference to corresponding CMYK changes;

transforming the original CMY printing colors to new CMY printing colors by use of said HSL changes without a color space translation of said original CMY printing colors to a new color space;

with a color computer, converting the new CMY printing colors to RGB colors; and displaying said original image modified by said corrections with a color video display which receives said RGB printing colors from said color computer.

2. A method according to claim 1 including the step of transforming the original CMY printing colors to the new CMY printing colors by applying said HSL changes on a pixel-by-pixel basis.

3. A method for permitting an operator to correct original CMYK printing colors in an original image, comprising the steps of:

providing original CMYK printing colors to be corrected by scanning the original image with an image scanner;

having the operator define desired corrections directly in terms of HSL changes without the operator making reference to corresponding CMYK changes;

transforming the original CMY printing colors to new CMY printing colors by applying said HSL changes to the original CMY printing colors without a color space translation of the original CMY printing colors to a new color space;

converting said new CMY printing colors to RGB colors; and feeding said RGB colors to a color video display for displaying a corrected image.

4. A method according to claim 3 wherein the HSL changes are applied directly to the original CMY printing colors.

5. A method according to claim 3 wherein the HSL changes are applied directly on a pixel-by-pixel basis to the original CMY printing colors.

6. A method for correcting original CMYK printing colors in an original image, comprising the steps of:

providing original CMYK printing colors to be corrected by scanning said original image with an image scanner;

defining desired corrections by defining corresponding HSL changes;

transforming the original CMY printing colors to new CMY printing colors by use of said HSL changes, said transforming comprising the steps of identifying in a printing color space of the original CMYK printing colors a gray line defining luminance changes but with an absence of color within the printing color space, and executing said HSL changes with respect to said gray line;

feeding said new CMY printing colors to a color computer for conversion to RGB colors; and feeding said RGB colors to a color video display which then displays a corrected image corresponding to said original image but with said desired corrections having been made therein.

7. A method according to claim 6 wherein the correction according to the H change is defined by a luminance plane perpendicular to a diagonal, said diagonal running next to said gray line in said printing color space, and a circle centered about said gray line on said luminance plane, and an arc segment of said circle.

8. A method according to claim 6 wherein the saturation change corresponds to a luminance plane perpendicular to a diagonal of said printing color space and a circle defined in said plane having a center defined by said gray line, and said saturation change being a difference in radial distance along a radial line from said gray line towards a periphery of said circle.

9. A method according to claim 6 wherein said luminance change comprises a distance along a portion of a line extending from a minimum luminance point at an end of said gray line.

10. A method according to claim 6 including the step of providing said CMY transformation based on use of an arbitrary optional mask which defines for each color point an extent of color correction.

11. A method according to claim 6 wherein the HSL changes are clamped within the printing color space so that no HSL corrections are permitted which result in new CMY values outside said printing color space and therefore unprintable.

12. A method according to claim 11 wherein the clamped changes comprise a saturation adjustment which preserves desired hue and luminance values.

13. A method for permitting an operator to correct an original CMYK color image and for displaying as a color video display a corrected color image, comprising the steps of:

providing an image scanner for scanning said original color image and which outputs original CMYK printing colors;

having the operator define corrections directly by individual HSL changes without the operator making reference to corresponding CMYK changes;

applying said HSL changes in a CMY transformation to said CMY original colors without a color space translation of said CMY original colors to a new color space so as to create new CMY colors, said HSL changes being applied to said original CMY printing colors;

converting said new CMY printing colors to RGB colors for a color video display; and feeding said RGB colors to said color video display and displaying said corrected color image.

* * * * *